2 Sheets--Sheet 1.

A. QUIROLO.

Stereoscopes.

No. 6,557. Reissued July 27, 1875.

Witnesses.
R. Boekler
Giovani Fagani

Inventor.
Antonio Quirolo

THE HORRIS PETERS CO., PHOTO-LITHO., WASHINGTON, D. C.

A. QUIROLO.

2 Sheets--Sheet 2.

Stereoscopes.

No. 6,557.

Reissued July 27, 1875.

Witnesses.

R. Boeklen

Giovanni Fusari

Inventor.

Antonio Quirolo

THE NORRIS PETERS CO., PHOTO-LITHO., WASHINGTON, D. C.

UNITED STATES PATENT OFFICE.

ANTONIO QUIROLO, OF HOBOKEN, NEW JERSEY.

IMPROVEMENT IN STEREOSCOPES.

Specification forming part of Letters Patent No. 156,311, dated October 27, 1874; reissue No. 6,557, dated July 27, 1875; application filed July 8, 1875.

*To all whom it may concern:*

Be it known that I, ANTONIO QUIROLO, of Hoboken, in the county of Hudson and State of New Jersey, have invented a new and Improved Stereoscope, of which the following is a specification:

Stereoscope-stands have usually been made with a round base, which soon warped and became otherwise deranged, so that the stereoscope did not stand firmly on its base. This is obviated by having the said base of the stand made with three legs suitably attached to the stand, to which my invention relates. It relates also to the construction of the picture-holder, which is made with a pivot, so that its position in relation to the lenses can be adjusted properly for observation, so that in case the position of the picture-holder has become deranged from warping or other cause, it can be readily readjusted to its proper position. Said invention relates also to the construction of the slides and stops for said slides of the picture-holder, as hereinafter more fully described.

Figure 1:
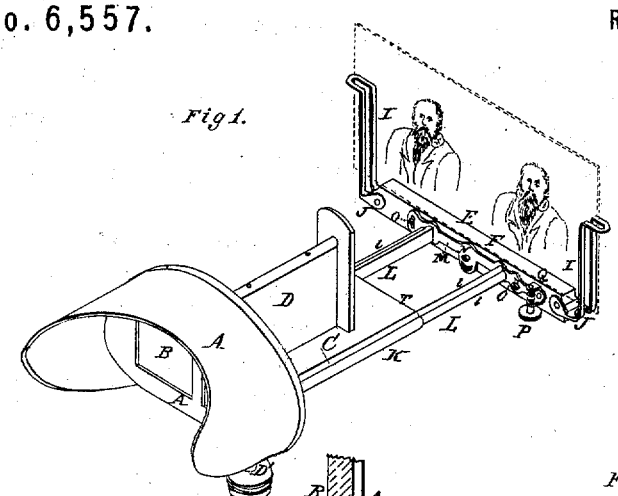
Figure 9:
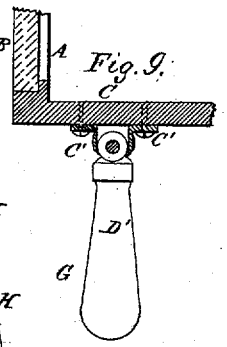
Figure 6:
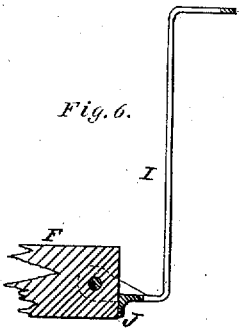
Figure 6:
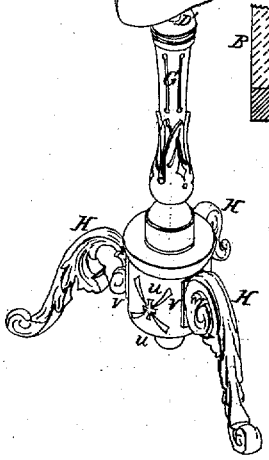
Figure 3:
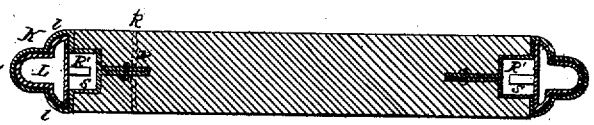
Figure 2:
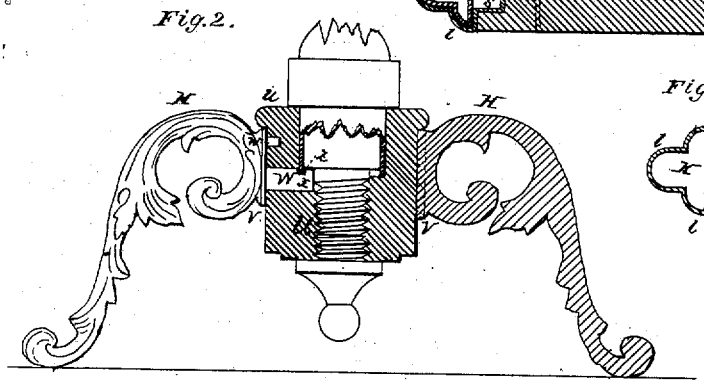
Figure 4:
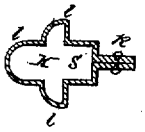
Figure 5:
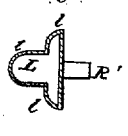
Figure 7:
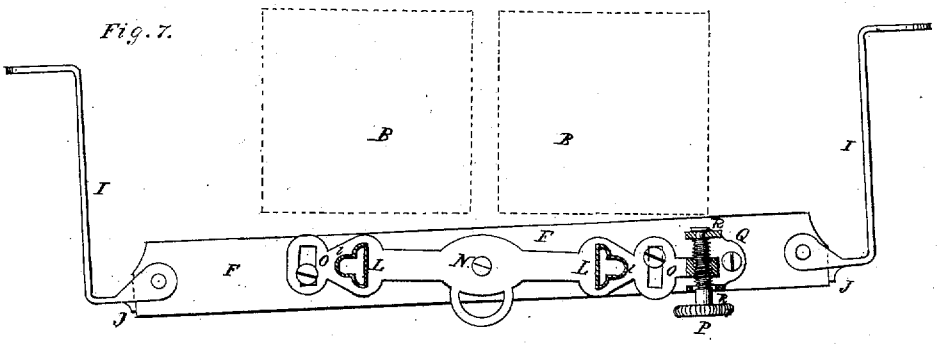
Figure 8:
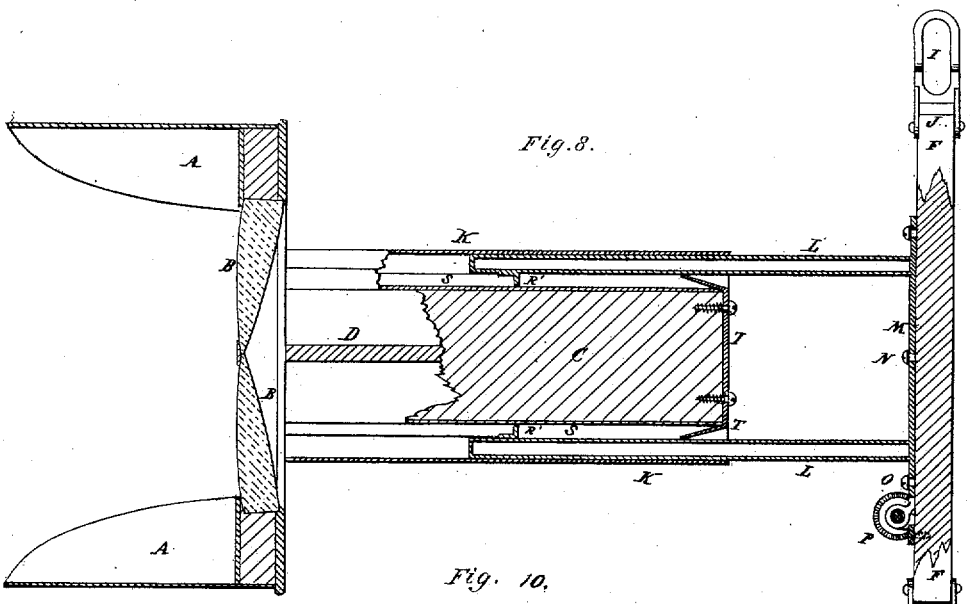
Figure 10:
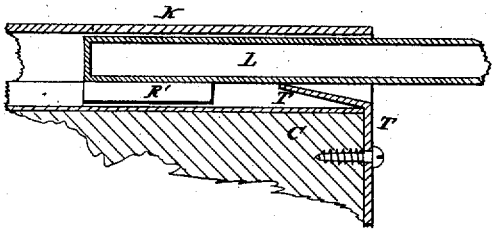

In the annexed drawings, Figure 1 represents a perspective view of the instrument with my improvements. Fig. 2 is a detached side view of the lower part and legs or base of the same, partly shown bisected. Fig. 3 represents a cross-section of the base-plate with the guides and guide-rods on an enlarged scale. Fig. 4 is a detached cross-section of one of the metal guides of the base-plates. Fig. 5 is a similar view of one of the guide-rods of the same. Fig. 6 is a detached vertical section of one of the uprights of the picture-holder guides. Fig. 7 is a lateral face view of the picture-holder—its guide-rods are bisected and the position of the lenses are indicated in dotted lines. Fig. 8 is a horizontal section of a portion of the base-plates, the guides and rods shown with a modification of the stop of the same. Fig. 9 represents a vertical section of the handle with the base of the lens-holder. Fig. 10 represents a modification of the stop R′.

A represents the lens-case or holder, within which the lenses B of the instrument are contained. To the rear of this case extends the base-plate C, and the vertical central dividing plate or partition D. E represents the picture-holder, which has a lateral bar, F, at its base, for resting the picture thereupon. To the lower or bottom side of the base-plate C is attached a metal plate, C′, which is secured to it, by screws or otherwise, to remain permanently on it and form part thereof. The handle D′ of the instrument, shown below said plate C, is pivoted to the plate C′, which latter may be made of wood or may be formed on the plate C or form part of the plate C, however it may be most convenient to construct it, and in all cases the pivot for said handle either forms part of the handle or is secured or forms part of said plate C. And the lower end of said handle rests in the top of the standard or column G, to which three legs, H H H, are secured. The bar F has on each end a pivoted picture-guide piece, I, which has, or is formed with, a vertical slot in which the picture is guided, and its lower end is bent right angular and terminates with an eye over each of the two sides of the end of the bar, as shown in Figs. 1, 4, 7, and 8, and through said opposite eyes, and into the bar, passes a pin on which said guide turns, and may be set upright to receive the picture, or may be folded upon said bar. Said guide is provided with a stop, J, on its lower part, which meets the end of the bar proper at the time whenever the guide is set vertical to receive the picture. The upper end of the said guide is also bent right angular and outward, to have the vertical sides of it to lap the picture, not to close its edge. The base-plate C has its two side edges parallel, and each furnished with tubular guides K K, and the picture-holder has two guide-rods, L L, which are made to fit and slide easy in said guides K with their forward ends. Their rear ends are both solidly combined with a lateral bar, M, and to this said bar is attached the lateral bar F by means of a central pivot, N, passing loosely through the bar M, and tightly entering the bar F. Said bar M extends beyond the rods L on each end, and through each of its parts extending is a slot, O, through which a screw is employed, passing tightly into the bar F, and having a head, to overlap the bar M. By this means both the bars are held properly together and still allowed to turn on one another.

The extreme end on the right-hand end of the bar M has an eye, which is threaded and furnished with a small vertical thumb-screw, P, passing through it. Said screw P is held in a bearing, Q, from moving longitudinally by means of small shoulders against both sides of said bearing upon the said screw, as shown in Fig. 7, at R R; and the said bearing is secured to the bar F with its base and has two arms, one for guiding the upper and the other for guiding the lower part of said screw P, which has on its bottom end a milled head for turning it, so as that, by turning the said screw, the bar F is caused to turn on the pivot N and with it the picture, and thereby the relative position of the picture with that of the lenses is readily adjusted and properly corrected, in case of having become incorrect by shrinking or warping (or other cause) of the instrument. The guide-rods L L have projections R′ on their forward ends, which pass in the grooves S with which each of the guides K is provided; and across the end of the base-plate C is secured a spring, T, the ends of which project into said grooves S, so as that said projections R′ are stopped from entirely withdrawing from the guides by means of said spring T. Both the guide-rods L as well as the guides K are drawn from sheet metal, tubular, to make them stiff and light. Both are formed with the three ribs *l l l*, and the guides K are larger to fit over the rods L, as shown in Figs. 3, 4, 5, and 8, and they have each the groove S formed on the inward side or toward the base-plate C; and beyond said groove S, and joining it, they are formed with a flange, *k*, or rib, to secure them by means of pins together and into the wood, which is made with a groove cut therein, as shown in Fig. 3. The projections R′ may be made of a separate piece soldered to the rod, as shown in Figs. 3, 5, and 8, or they may be formed of the same piece, as shown in Fig. 10. The lower portion or base U of the column G is made or may be made separate, and with a threaded central vertical opening into which the lower end of the upper portion of the said column is fitted, as shown in Fig. 2; and to the periphery of said base U are fitted and secured the legs H H H. Said legs have a scroll shape, are neatly ornamented, as shown, and provided with a shoulder-plate, V, bearing against said base. They may be secured to the base by screws passing through their plates V, as shown on the right-hand side in Fig. 2, which is intended for instruments of less expensive or of common construction. But for durable, highly-finished, and expensive instruments I prefer to have said legs formed with dowel-pins W, which pass into said base, as shown on the left-hand side of said figure; and on said lower end of the column which enters the base U is formed an annular downward-projecting shoulder, X, which enters a small groove, Z, cut into the top side of the end of each of the dowel-pins W, by which means said dowel-pins W, and, consequently, the legs H, are held and secured in said base, and prevented from withdrawing from the same. By means of a secondary small stud or dowel, *w*, projecting from said plate V into the base U, the leg is held from turning and twisting, or in proper upright position. When the legs, secured with screws, require to be detached for packing said screws are withdrawn. If the legs are made with dowel-pins W, the upper portion of the column is unscrewed sufficient to withdraw its shoulder X from the groove Z in the said dowel-pin, whereby the legs are liberated from the base U, and may be readily packed. Said legs may be secured to said base by means of dovetail tongues and grooves on said base and legs, or by other means, but they are always secured in such manner that they may be readily detached for packing, and are always ornamented to improve the appearance of the standard and instrument.

The picture-holder E may not have the pivot N to turn upon for adjusting the same. It may be made movable and adjustable laterally with the lenses by various other means. I prefer the means shown, they being convenient to use.

What I claim as my invention, and desire to secure by Letters Patent therein, is—

1. The combination, with the standard of a stereoscope, of the series of legs suitably attached thereto, substantially as and for the purposes set forth.

2. The pivoted picture-holder, upright guides I I, and their stops J J, substantially as and for the purpose herein described.

3. The spring T, in combination with the guide-rods L, and guides K, and stops R, and grooves S, substantially as and for the purpose herein described.

In witness whereof I have hereto set my hand.

ANTONIO QUIROLO.

In presence of—
L. R. GOLDSMITH
F. MEYER.